US010877812B2

(12) United States Patent
Siegl et al.

(10) Patent No.: US 10,877,812 B2
(45) Date of Patent: Dec. 29, 2020

(54) HARDWARE ENVIRONMENT AND METHOD OF PERFORMING MATRIX MULTIPLICATION IN ARTIFICIAL INTELLIGENCE APPLICATIONS

(71) Applicant: International Business Machines Corporation, Armonk, NY (US)

(72) Inventors: Patrick D.M. Siegl, White Plains, NY (US); Fabio Checconi, Peekskill, NY (US); Daniele Buono, Warrington (GB); Alessandro Morari, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 16/123,098

(22) Filed: Sep. 6, 2018

(65) Prior Publication Data

US 2020/0081744 A1     Mar. 12, 2020

(51) Int. Cl.
*G06F 15/16*      (2006.01)
*G06F 9/50*       (2006.01)
*G06N 3/063*      (2006.01)
*H04L 12/42*      (2006.01)
*G06F 9/38*       (2018.01)

(52) U.S. Cl.
CPC ............. *G06F 9/5061* (2013.01); *G06F 9/38* (2013.01); *G06F 9/5027* (2013.01); *G06N 3/063* (2013.01); *H04L 12/42* (2013.01)

(58) Field of Classification Search
CPC .................................................. G06F 9/5061
See application file for complete search history.

(56) References Cited

U.S. PATENT DOCUMENTS

| 5,944,819 | A | 8/1999 | Kumar et al. |
|---|---|---|---|
| 7,490,120 | B2 | 2/2009 | Gustavson et al. |
| 7,912,889 | B1 | 3/2011 | Jaffa et al. |
| 9,928,460 | B1* | 3/2018 | Nowatzyk ............ G06N 3/0454 |
| 10,606,651 | B2* | 3/2020 | Burger ................. G06F 9/5077 |
| 2018/0315158 | A1* | 11/2018 | Nurvitadhi ............... G06T 1/20 |
| 2019/0114535 | A1* | 4/2019 | Ng ........................ G06N 3/0454 |
| 2019/0205746 | A1* | 7/2019 | Nurvitadhi ............. G06N 3/063 |

OTHER PUBLICATIONS

Zadeh, R.B., et al., "Matrix computations and optimization in apache spark", Proceedings of the 22nd ACM SIG KDD International Conference on Knowledge Discovery and Data Mining, ACM, Aug. 13-17, 2016, 8 pages.
(Continued)

*Primary Examiner* — Kevin T Bates
*Assistant Examiner* — Clarence D McCray
(74) *Attorney, Agent, or Firm* — Scully, Scott, Murphy & Presser, P.C.; Daniel P. Morris

(57) ABSTRACT

A plurality of hardware accelerators are interconnected and include a special processing unit and accelerator memory. At least one host computer is coupled to each of the plurality of hardware accelerators and includes a general processing unit and host memory. The plurality of hardware accelerators exchange data in a ring communication pattern in computing a linear layer of a neural network.

20 Claims, 16 Drawing Sheets

(56) References Cited

OTHER PUBLICATIONS

Castillo, M., et al. "Out-of-Core Solution of Linear Systems on Graphics Processors", Jaume I University, Department of Computer Science and engineering, May 2008, 16 pages.

Gunter, B.C., et al., "Parallel Out-of-Core Cholesky and QR Factorization with POOCLAPACK", Proceedings of the 15th International Parallel & Distributed Processing Symposium (IPDPS-01), Apr. 23-27, 2001, 10 pages.

Choi, J., et al., "ScaLAPACK: A Scalable Linear Algebra Library for Distributed Memory Concurrent Computers", Proceedings of the Fourth Symposium on the Frontiers of Massively Parallel Computation, Oct. 19-21, 1992, pp. 120-127.

Toledo, S., et al., "The Design and Implementation of SOLAR, a Portable Library for Scalable Out-of-Core Linear Algebra Computations", IOPADS '96, Proceedings of the fourth workshop on I/O in parallel and distributed systems: part of the federated computing research conference, May 27, 1996, 13 pages.

Datta, K., et al., "Stencil Computation Optimization and Auto-Tuning on State-of-the-Art Multicore Architectures", SC 08: Proceedings of the 2008 ACM/IEEE Conference on Supercomputing, Nov. 15-21, 2008, 12 pages.

Wang, L., et al., "BLASX: A High Performance Level-3 BLAS Library for Heterogeneous Multi-GPU Computing", https://arxiv.org/pdf/1510.05041.pdf, Oct. 16, 2015, 10 pages.

Van De Geijn, R.A., "SUMMA: Scalable Universal Matrix Multiplication Algorithm", Technical Report, University of Texas at Austin, Austin, TX, USA, Manuscript, Issued Online Dec. 4, 1998, 19 pages.

Nvidia, Cublas Library, User Library, http://docs.nvidia.com/cuda/cublas/index.html#using-the-cublasXt-api, Last updated Aug. 1, 2018, 190 pages, v9.2.148.

* cited by examiner

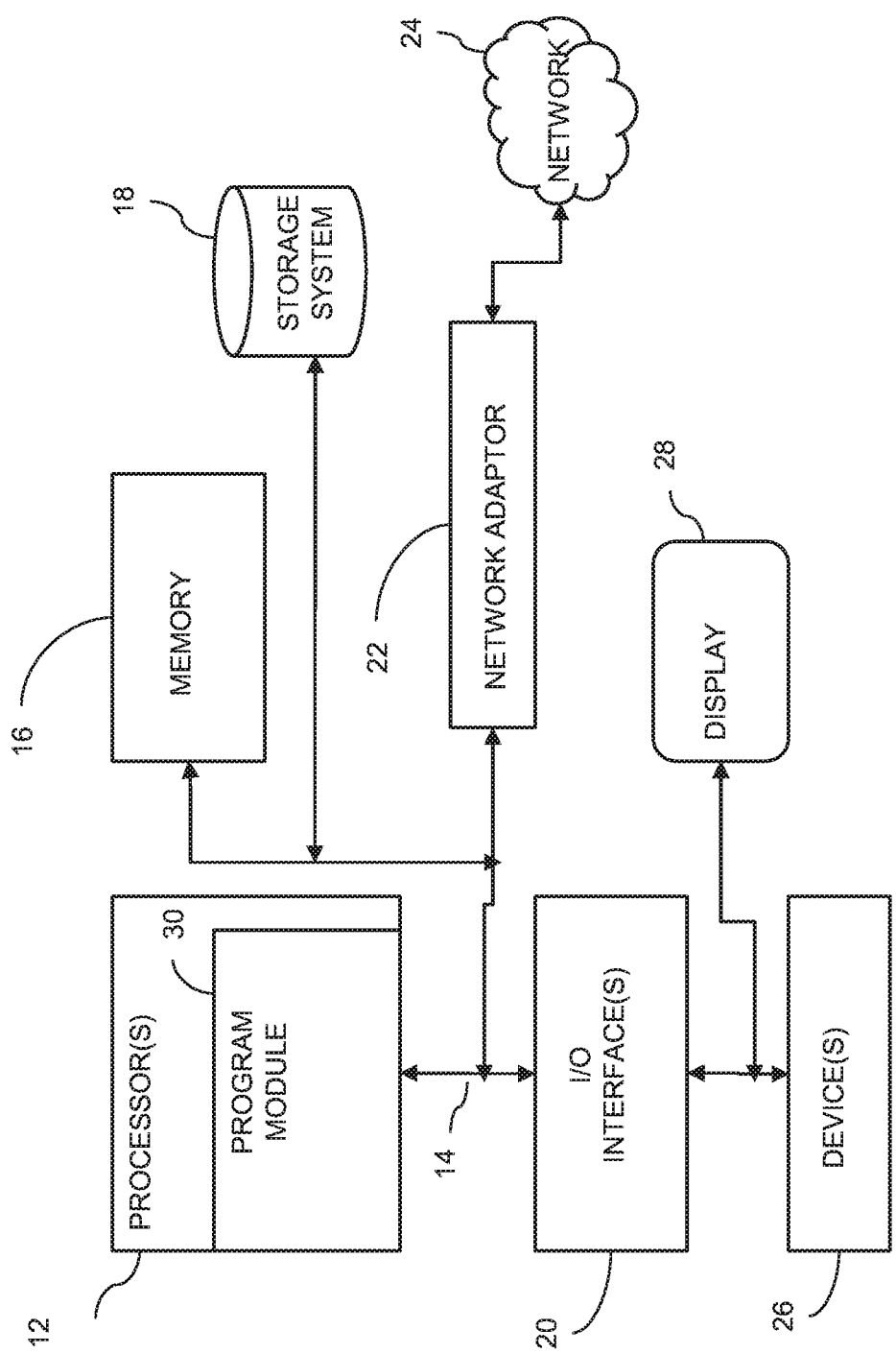

HARDWARE ENVIRONMENT AND METHOD OF PERFORMING MATRIX MULTIPLICATION IN ARTIFICIAL INTELLIGENCE APPLICATIONS

BACKGROUND

The present application relates generally to computers and computer applications, and more particularly to hardware configuration and environment for matrix multiplication in artificial intelligence applications.

The computation associated with a linear layer in a neural network is a multiplication between two matrices, also called General Matrix to Matrix Multiplication (GEMM) in Basic Linear Algebra Subprograms (BLAS) terminology. While existing computer systems, for example, heterogeneous systems, can implement GEMM, traditional BLAS implementation on a heterogeneous system are not optimized for the GEMM shapes and sizes used in inferencing with neural networks.

BRIEF SUMMARY

A system, in one aspect, may include a plurality of hardware accelerators interconnected via an accelerator interconnect, each of the plurality of hardware accelerators comprising a special processing unit and accelerator memory. At least one host computer may be coupled to each of the plurality of hardware accelerators via an accelerator link. The at least one host computer may include a general processing unit and host memory. The plurality of hardware accelerators may exchange data in a ring communication pattern in computing a linear layer of a neural network.

A computer-implemented method of performing a matrix to matrix operation involving a first matrix, a second matrix and a third matrix, in one aspect, may include splitting the first matrix by row into P partitions and the third matrix by row into P partitions, P representing a number of hardware accelerators involved in the matrix to matrix operation, each partition of the first matrix and each partition of the third matrix stored on a different hardware accelerator. The method may also include splitting the second matrix by row into P partitions, each partition of the second matrix stored by column on the different hardware accelerator. The method may further include each of the P hardware accelerators in parallel multiplying one block of the second matrix stored locally by corresponding columns of the partition of the first matrix stored locally and accumulating a result into a local partition of the third matrix. The method may also include, each of the P hardware accelerators in parallel reading a block of the second matrix stored on its neighbor accelerator in a ring communication pattern and multiplying the block of the second matrix read by the corresponding columns of the partition of the first matrix stored locally and accumulating a result into the local partition of the third matrix. The method may further include, each of the P hardware accelerators repeating the reading of the block of the second matrix stored on its neighbor accelerator in a ring communication pattern and multiplying the block of the second matrix read by the corresponding columns of the partition of the first matrix stored locally and accumulating a result into the local partition of the third matrix, until all partitions of the second matrix have taken part in the multiplying.

A computer-implemented method of performing a matrix to matrix operation involving a first matrix, a second matrix and a third matrix, in another aspect, may include splitting the first matrix by row into P partitions and the third matrix by row into P partitions, P representing a number of hardware accelerators involved in the matrix to matrix operation, all partitions of the first matrix stored on a host computer and each partition of the third matrix stored on a different hardware accelerator. The method may further include splitting the second matrix by row into P partitions, each partition of the second matrix stored by column on the different hardware accelerator. The method may also include, each of the P hardware accelerators in parallel fetching a block of matrix A from the host computer corresponding to a locally stored block of matrix B. The method may further include, each of the P accelerators in parallel multiplying one block of the second matrix stored locally by corresponding columns of the partition of the first matrix fetched from the host computer and accumulating a result into a local partition of the third matrix. The method may also include, each of the P accelerators in parallel reading a block of the second matrix stored on its neighbor accelerator in a ring communication pattern and at the same time fetching a next block of the first matrix from the host computer, and repeating the multiplying, reading and fetching until all partitions of the second matrix have taken part in the multiplying.

A computer-implemented method of performing a matrix to matrix operation involving a first matrix, a second matrix and a third matrix, in another aspect, may include splitting the first matrix by row into P partitions and the third matrix by row into P partitions, P representing a number of hardware accelerators involved in the matrix to matrix operation, all partitions of the first matrix and the third matrix stored on a host computer. The method may also include splitting the second matrix by row into P partitions, all partitions of the second matrix stored by column on the host computer. The method may further include, each of the P hardware accelerators in parallel fetching a block of the third matrix wherein all of the P hardware accelerators work on a separate partition of the third matrix. The method may also include, each of the P hardware accelerators in parallel fetching a block of the first matrix and a block of the second matrix from the host computer, wherein the block of the first matrix and the block of the second matrix are multiplied to produce a contribution to a local partition of the third matrix. The method may also include, each of the P accelerators in parallel multiplying the block of the second matrix by corresponding columns of the partition of the first matrix fetched from the host computer and accumulating a result into the local partition of the third matrix. The method may further include, each of the P accelerators in parallel reading a block of the second matrix stored on its neighbor accelerator in a ring communication pattern and at the same time fetching a next block of the first matrix from the host computer, and repeating the multiplying, reading and fetching until all partitions of the second matrix have taken part in the multiplying.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 10 illustrates a schematic of an example computer or processing system that may implement a host computer system in one embodiment of the present disclosure.

DETAILED DESCRIPTION

Figure 1:
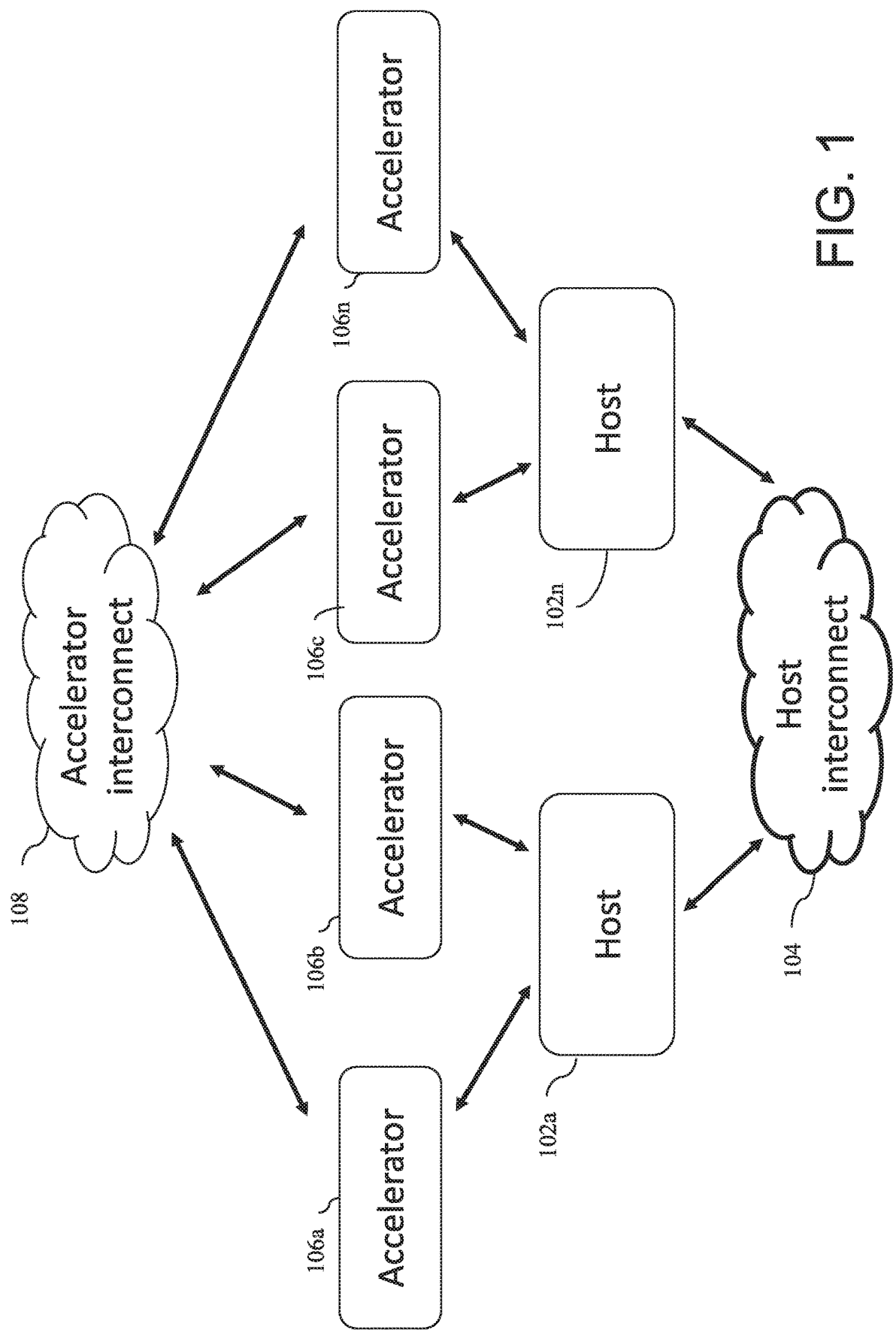
FIG. 1 is a diagram illustrating an architectural overview of a heterogeneous system in one embodiment.

A method, system and techniques of performing General Matrix to Matrix Multiplication (GEMM) on a heterogeneous system are disclosed. FIG. 1 is a diagram illustrating an architectural overview of a heterogeneous system in one embodiment. A heterogeneous system may include multiple host nodes $102a$, $102n$ interconnected by a host interconnect 104, and by multiple accelerators $106a$, $106b$, $106c$, $106n$ connected by and accelerator interconnect 108. Accelerators $106a$, $106b$, $106c$, $106n$ provide compute functionality and are equipped with their own memory. Each accelerator $106a$, $106b$, $106c$, $106n$ is attached to a host node $102a$, $102n$ by means of an accelerator link. Examples of the accelerators may include, but are not limited to, a graphics processing unit (GPU), an application-specific integrated circuit (ASIC), a field-programmable gate array (FPGA), and/or others. A host interconnect 104 may include interconnect architecture such as, but not limited to, NVLink (from NVIDIA, Santa Clara, Calif.), for instance, for connecting a host computer (e.g., $102a$, $102n$) to an accelerator (e.g., $106a$, $106b$, $106c$, $106n$), and may provide for low latency, high speed, direct memory access connectivity between devices, for example, of different instruction set architectures. A host interconnect 104 may include other standards or connections. In an embodiment the accelerators may be connected, for example, by interconnects such as Cache Coherent Interconnect for Accelerators (CCIX).

In one aspect, a method operates on matrices that can occupy more memory than available on a single accelerator (e.g., one of $106a$, $106b$, $106c$, $106n$), and that can take advantage of the multiple kinds of links available in the system. Given an m×k matrix A, a k×n matrix B, and an m×n matrix C, GEMM can be formalized as:

$$C \leftarrow \alpha AB + \beta C$$

The method in one embodiment operates on matrices with k»m>n. The method, system and techniques may handle cases in which: all the matrices reside in accelerator memory (e.g., memory associated with one or more of $106a$, $106b$, $106c$, $106n$); matrices B and C reside in accelerator memory (e.g., memory associated with one or more of $106a$, $106b$, $106c$, $106n$); and matrices B and C reside in host memory (e.g., memory associated with one or more of $102a$, $102n$), but their size does not exceed the accelerator memory minus temporary work buffers.

In some embodiments, linear layers of a neural network are computed on a system comprising multiple accelerators, for example, as shown in FIG. 1. In some embodiments, the computational data is exchanged among accelerators in a ring fashion, for example, with input being provided in the memory of the accelerators $106a$, $106b$, $106c$, $106n$.

In another aspect, the input may be provided in part in the memory of the accelerators $106a$, $106b$, $106c$, $106n$, in part in the memory of the hosts $102a$, $102n$. The data may be transferred onto and between the accelerators $106a$, $106b$, $106c$, $106n$. There may be overlapping transfers and computation between accelerators and between host-accelerator pairs.

In one aspect, input may be provided initially entirely in the memory of the hosts, and data then may be transferred onto and between the accelerators. There may be overlapping transfers and computation between accelerators and between host-accelerator pairs.

Briefly, an accelerator (e.g., $106a$, $106b$, $106c$, $106n$) refers to a hardware device, for example, designed to improve the overall performance of the computer. An example of an accelerator is a graphics accelerator with its own processor such as a graphics processing unit (GPU) and memory such as random access memory (RAM). Hardware accelerators $106a$, $106b$, $106c$, $106n$ perform a given specific function more efficiently than a process running on a general-purpose computer, which for example, runs its processes on a central processing unit (CPU). A host computer (e.g., $102a$, $102n$) may be a general-purpose computer, for example, which includes a processor such as a CPU and also may include memory such as RAM, and/or others.

Figure 2A:
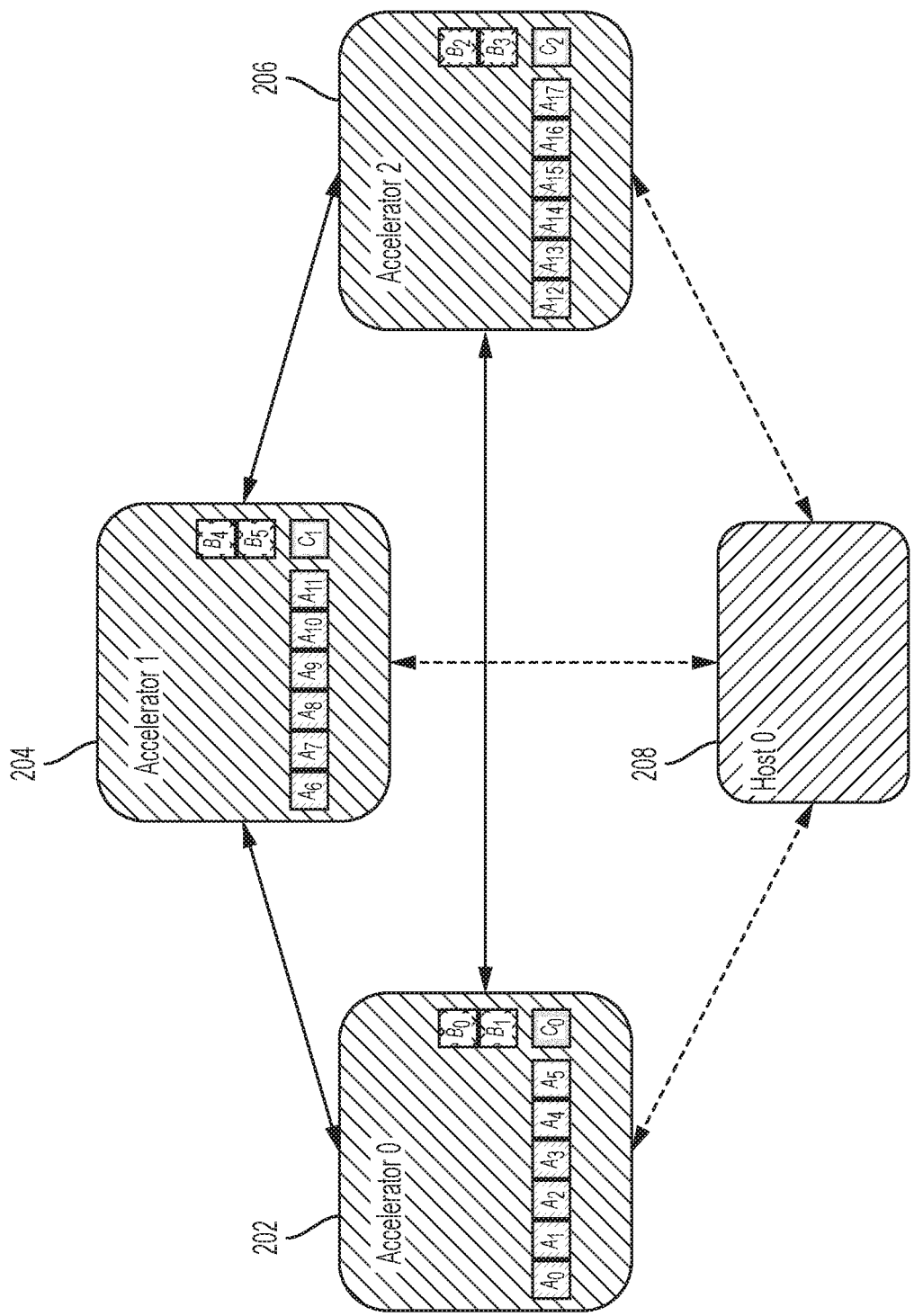
FIGS. 2A-2C illustrate an embodiment of a system configuration in performing General Matrix to Matrix Multiplication (GEMM) in one embodiment.
Figure 2B:
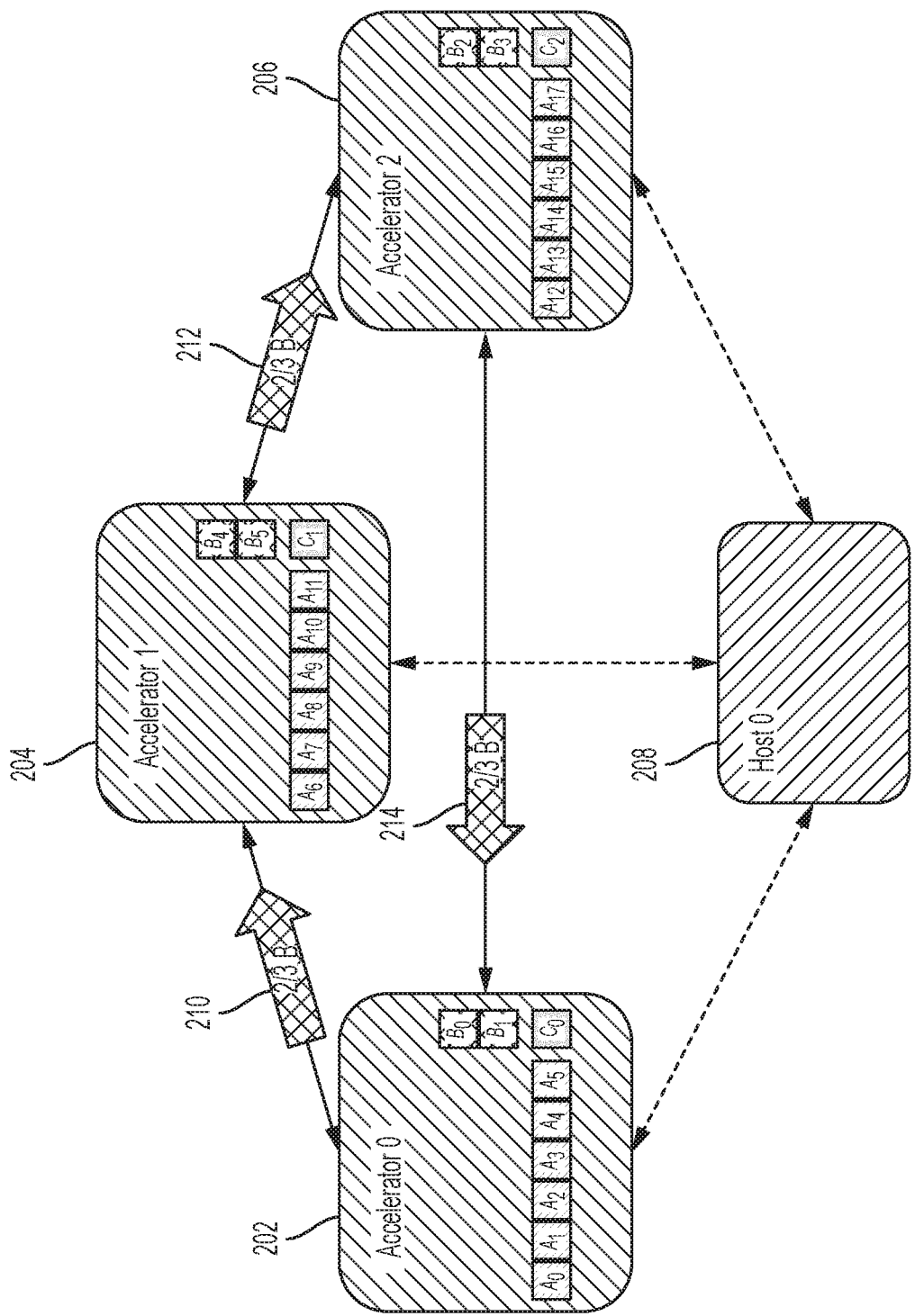
Figure 2C:
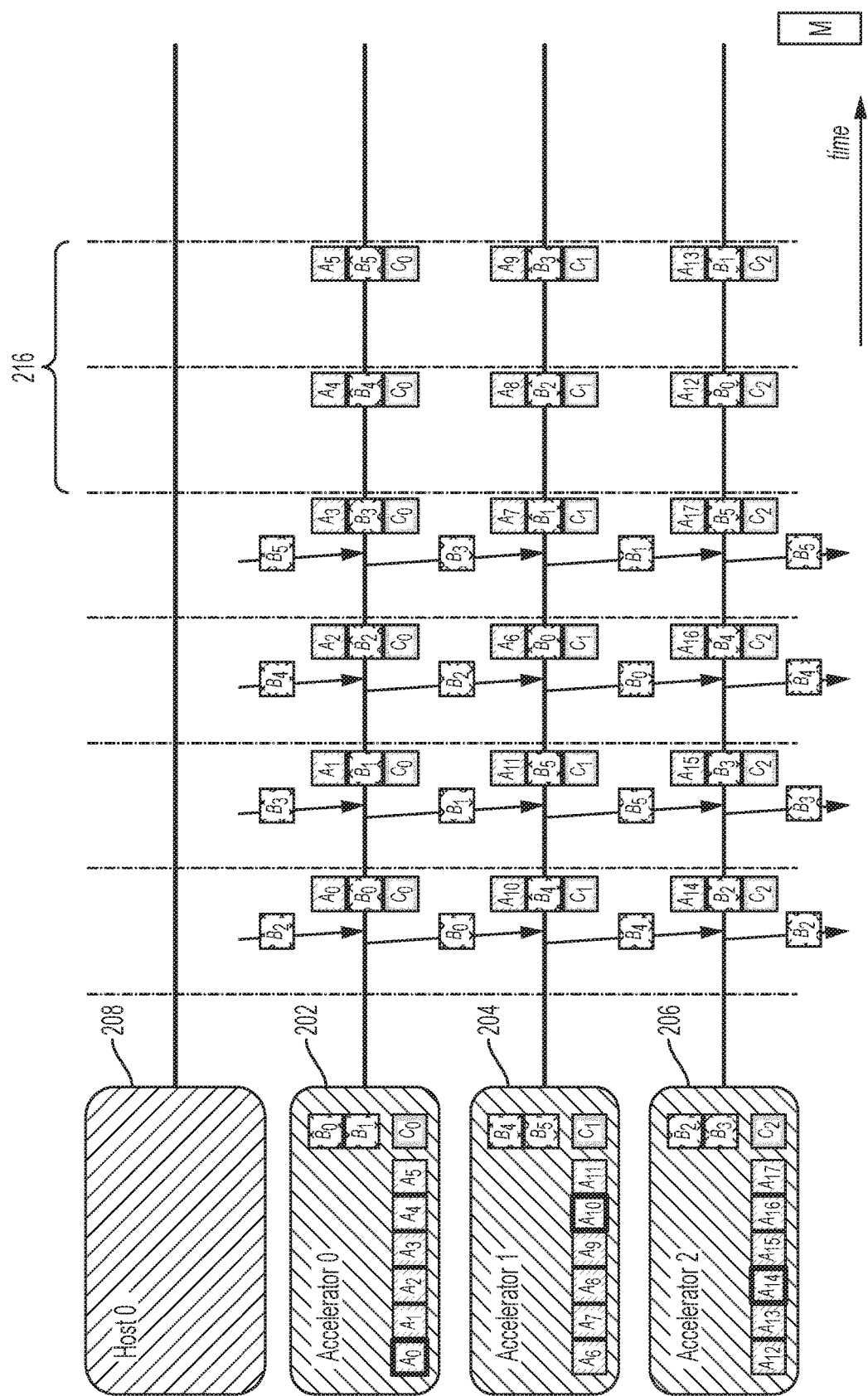

FIG. 2A-2C illustrate an embodiment of a system configuration in performing GEMM in one embodiment. In this embodiment, the system includes P accelerators 202, 204, 206 and matrices A, B, and C reside in accelerator memory. For example, in this embodiment, all the matrices reside in accelerator memory. In one embodiment, a host processor or computer 208 and accelerators 202, 204, 206 are connected by a uniform mesh. Each accelerator 202, 204, 206 hosts n (in this example case, 2) sub-blocks of matrix B as well as one partition of matrix A.

FIG. 2A illustrates an initial state of the system with three accelerators as an example. In one embodiment, matrices A and C are split by row into P partitions, stored in column-major order. A partition of matrix A is defined as a submatrix of size m/P by k, a partition of matrix B defined as a submatrix of size k/P by n while matrix C's partition is defined as a submatrix of size m/P by n. Each partition of matrix A and matrix C is stored on a different accelerator. Matrix B is split by row into P partitions, stored in column-major order on the P accelerators' random access memory. Briefly, in a column-major order, the consecutive elements of a column reside next to each other in memory, e.g., contiguous in memory.

Partitions of matrices A, B and C are split into 2-dimensional submatrices to perform GEMM on smaller matrices. In some embodiments, when a partition P is split columnwise into x submatrices, a submatrix of matrix A has the size (m*k)/(P*x), that is, height (number of rows) is m/P, and width (number of columns) is k/x). Subsequently, matrix B is split among rows into x matrices as well. A submatrix of matrix B has the size (k*n)/(P*x), that is, height (number of rows) is k/(P*x), and width (number of columns) is n (in this example, width of matrix B is not split). In FIG. 2A, submatrices are, for simplicity, linearly labeled.

In one embodiment, each accelerator 202, 204, 206, in parallel execution, multiplies one block of matrix B stored locally, by the corresponding columns of the partition of matrix A stored locally. The result is accumulated into the local partition of matrix C. If the multiplication is complete (e.g., if all blocks of matrix B have taken part in the multiplication) the method exits and the result is left in matrix C. As the input matrix C is distributed across multiple accelerators, the output matrix C is distributed in the same way at the end of the multiplication. Depending on the computation that follows, matrix C may be kept in the accelerators, or copied to the host memory and reassembled in a single matrix.

FIG. 2B illustrates a buffer flow with three accelerators as an example. Each accelerator 202, 204, 206, in parallel, reads the block of B stored on its neighbor in a ring communication pattern. In one embodiment, the ring communication pattern employs a consistently same direction, for example, a clock-wise or a counter-clockwise ring. The pattern may be pre-defined, and both directions may have the same performance metrics. In the given example, accelerator 0 needs to compute C0. C0 is computed by performing A0*B0+A1*B1+A2*B2+A3*B3+A4*B4+A5*B5 (where '*' represents a matrix multiplication). As B0 and B1 is given (residing on accelerator 0's memory), accelerator 0 requires A0 and A1 to perform first matrix multiplication. Subsequently, B2 and B3 are required that can be fetched from accelerator 2. At the same time A2 and A3 can be streamed from the host, if those partitions are not already in accelerator 0. Since accelerator 2 streamed B4 and B5 from accelerator 1 in a previous iteration step, accelerator 0 can fetch both B4 and B5 in the last two steps from accelerator 2. Hence, the order of performing matrix multiplication and transfers is derived by GEMM itself. In some embodiments, before computation and transfer start, the host 208 sets up the accelerators 202, 204, 206 and the host is responsible for orchestrating the cooperation between accelerators or informs the accelerator of the proper buffer flow. Each of the accelerators 202, 204, 206 then repeats the multiplication processing of the block of B that is read with corresponding columns of the partition of matrix A stored locally.

FIG. 2B illustrates the clock-wise movement of the sub-blocks of matrix B. These movements form a ring pattern among the accelerators, for instance, shown by buffer movements at 210, 212, 214. Since each accelerator needs to see the entire matrix B, and n sub-blocks of matrix B are already within its own memory, (P−1)/P of matrix B is streamed into and out of the accelerator. For instance, if there are 3 partitions (P), ⅔ of matrix B is streamed into and out of an accelerator. In some embodiments, to allow computation and data exchange to proceed concurrently, a free work-buffer of the size of a submatrix of matrix B is allocated per accelerator. After a buffer has been used in a computation, it can be subsequently used freely to stream in a new submatrix of matrix B. As an example, B0 is used for computation in the first step by accelerator 0. In the first step, accelerator 0 also copies B2 to the empty work-buffer. In the subsequent step, B0 is no longer required by accelerator 0 so that accelerator 0 can transfer B3 from accelerator 2 into the buffer of B0.

FIG. 2C illustrates a communication timeline of three accelerators as an example. In one embodiment, accelerators 202, 204, 206 execute in lock step. During each step one sub-block of matrix B is pushed to the direct neighbor, hence at each step a sub-block of matrix B is received. At the same time one multiplication is performed on an accelerator. After all of the sub-blocks of matrix B have been seen by each accelerator, communication can stop. Multiplications continue until all elements of matrix A are consumed, for example, as shown at time steps 216.

Figure 3A:
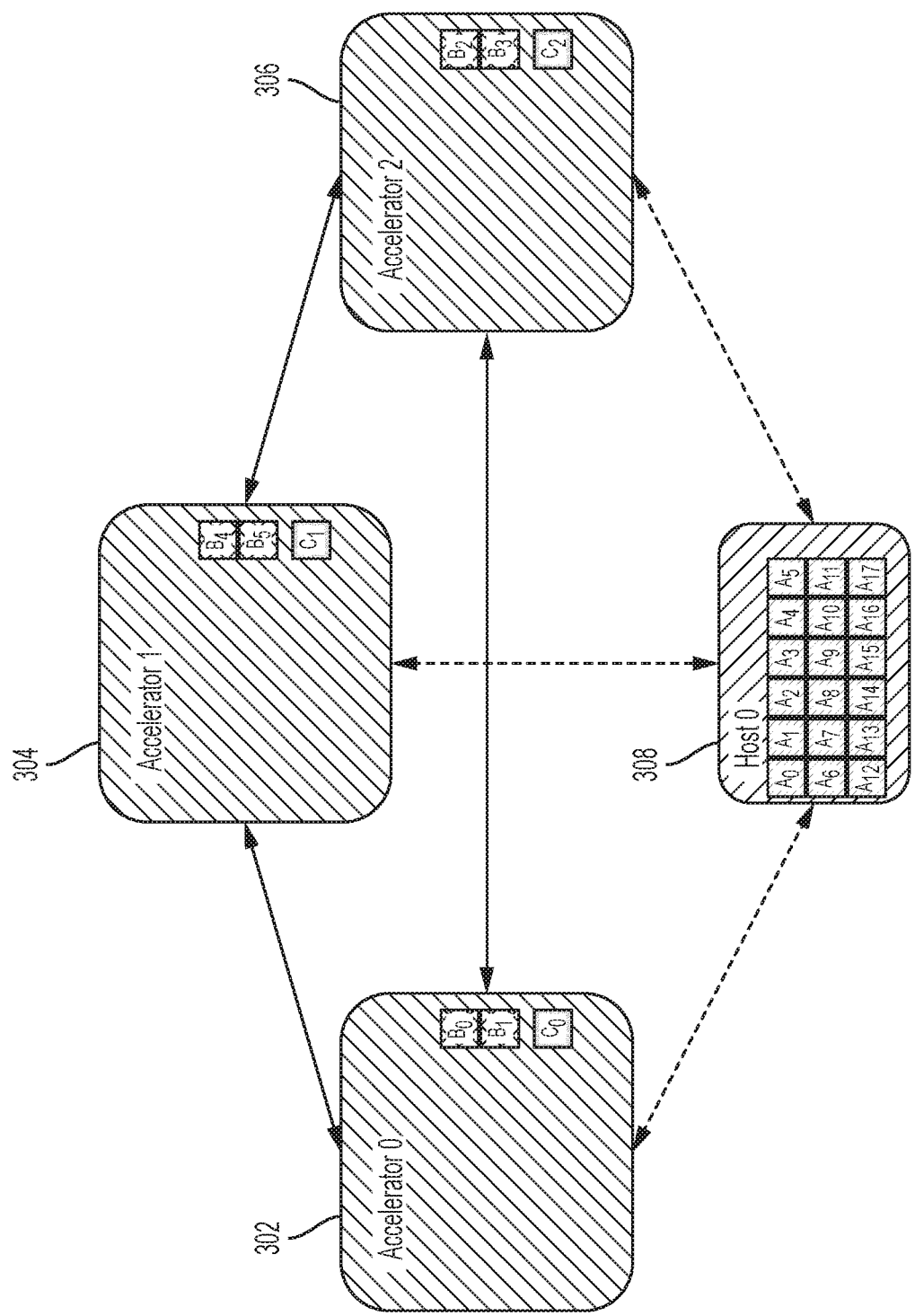
FIGS. 3A-3C illustrate an embodiment of a system configuration in performing GEMM in one embodiment.
Figure 3B:
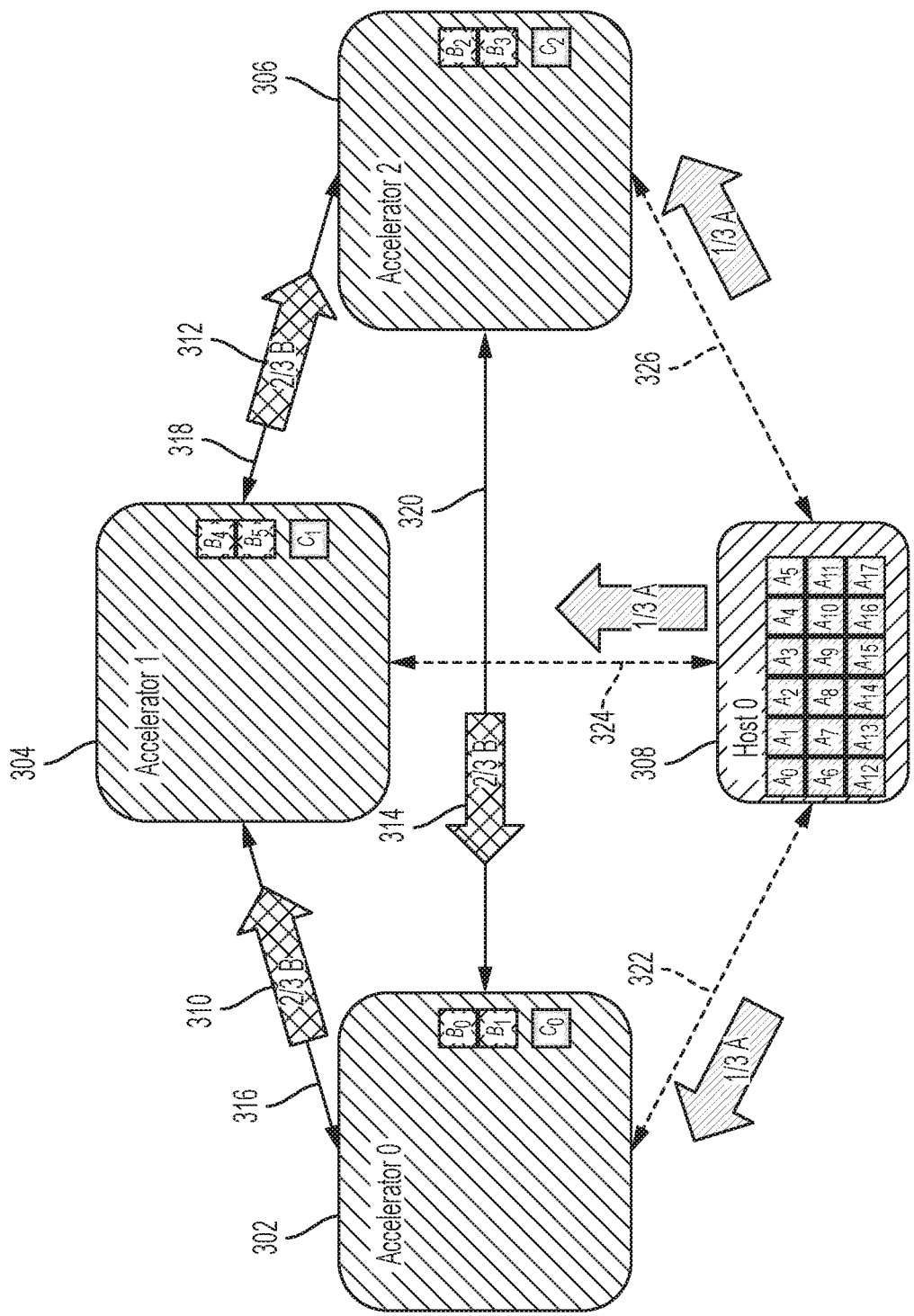
Figure 3C:
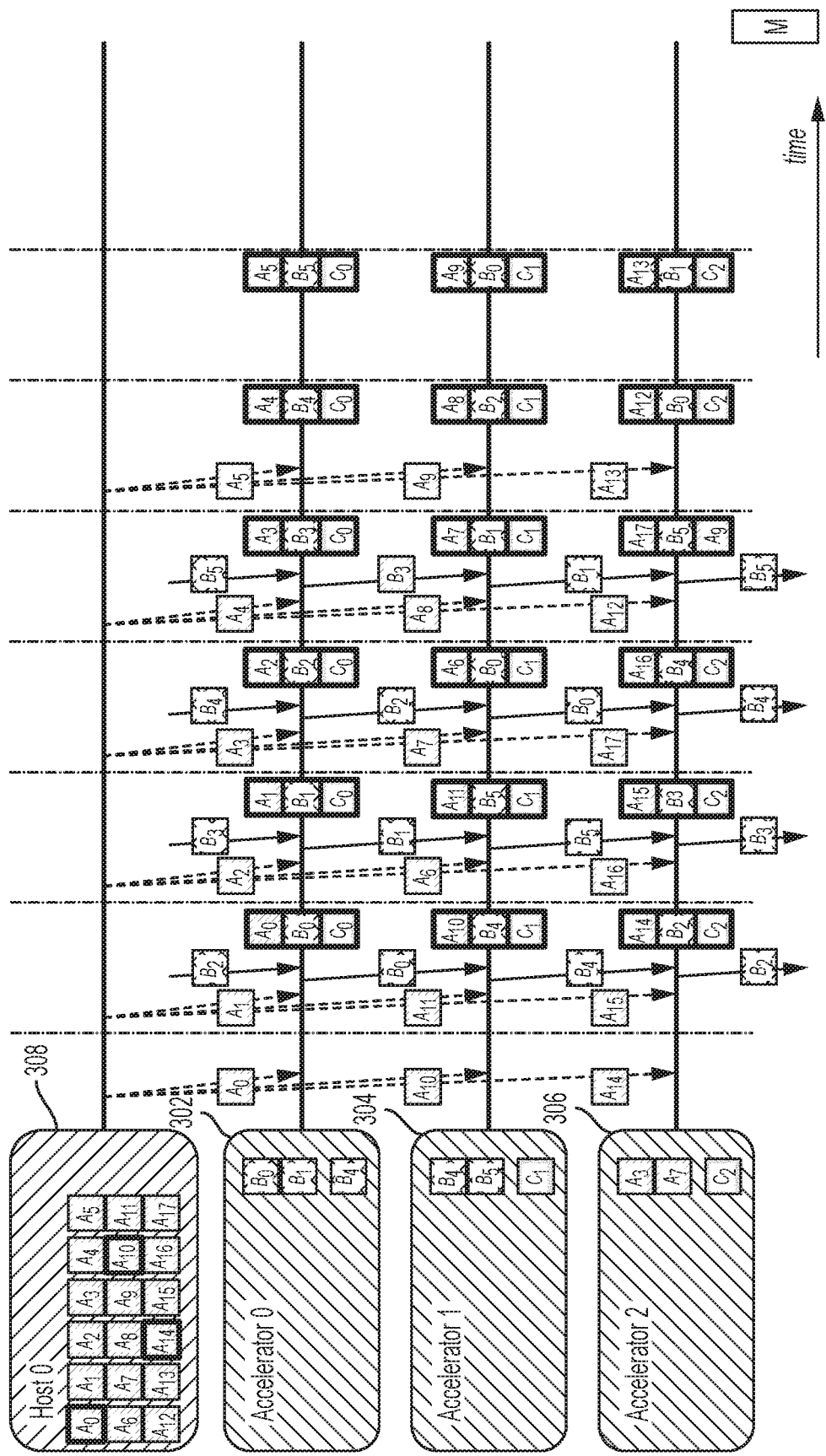

FIGS. 3A-3C illustrate an embodiment of a system configuration in performing GEMM in one embodiment. In this embodiment, matrix A resides in host memory, and matrices B and C in accelerator memory. P accelerators in the system participate in a GEMM operation in one embodiment. FIG. 3A shows an initial state of the system configuration, in which the system includes three accelerators 302, 304, 306 and a host computer 308 participating in a GEMM operation in one embodiment. A host computer 308 and accelerators 302, 304, 306 are connected by a uniform mesh. Each accelerator 302, 304, 306 hosts n (in this case, 2) sub-blocks of matrix B. The entire matrix A resides on the host 308.

Matrices A and C are split by row into P partitions, stored by column. All partitions of matrix A are stored in host memory of the host computer 308, and each partition of matrix C is stored on a different accelerator, e.g., 302, 304, 306. Matrix B is split by row into P partitions, stored by column on the P accelerators 302, 304, 306.

FIG. 3B shows a buffer flow in a heterogeneous system with three accelerators in one embodiment. In this embodiment, each accelerator 302, 304, 306, in parallel, fetches a block of matrix A from a memory of the host computer 308, corresponding to the block of matrix B contained in it. The embodiment shown in FIG. 3B may leverage the same blocking mechanism described with reference to FIGS. 2A-2C to rotate matrix B. In addition, submatrices of matrix A are transferred from the host to the individual accelerators depending on which submatrix of matrix A is required at a specific point in time within the accelerator. This is derived from a tiling of the entire GEMM and the rotation. For example, accelerator 0 302 computes C0 by performing A0*B0+A1*B1+A2*B2+A3*B3+A4*B4+A5*B5 (where '*' represents a matrix multiplication). As B0 and B1 are given, and B2, B3, B4 and B5 are streamed in the mentioned sequence, submatrices A0, A1, A2, A3, A4, A5 need to be streamed into accelerator 0 302. Each accelerator 302, 304, 306, in parallel, multiplies one block of matrix B stored locally by the corresponding columns of the partition of matrix A fetched from the host memory. The result is accumulated into the local partition of matrix C. If the multiplication is complete (e.g., if all blocks of matrix B have been used) the computation stops and the result is left in C.

Each accelerator 302, 304, 306, in parallel, reads a block of matrix B stored on its neighbor in a ring communication pattern. At the same time, each accelerator 302, 304, 306 fetches the next block of matrix A from the host memory of the host 308. In one embodiment the same direction is used consistently in the transfers of matrix B blocks, for example, a clock-wise or a counter-clockwise direction can be employed. The processing repeats fetching and multiplying until all blocks are processed. For example, accelerator 0 302, for example, needs to compute A0*B0+A1*B1+ A2*B2+A3*B3+A4*B4+A5*B5 to obtain C0, whereas accelerator 1 304, for example, computes A6*B0+A7*B1+ A8*B2+A9*B3+A10*B4+A11*B5 to obtain C1, while accelerator 2 306 computes A12*B0+A13*B1+A14*B2+

A15*B3+A16*B4+A17*B5 to obtain C2 (where '*' represents a matrix multiplication). As a few submatrices of matrix B are given, each accelerator computes the matrix multiplications that can be performed with the given start B submatrices, for example, in case of accelerator 0 302, A0*B0 and A1*B1, while the result is always accumulated with C0. As B2 is streamed into accelerator 0 302, the next computation is B2*A2, and so on. The same mechanism applies to the other accelerators.

As an example, FIG. 3B illustrates a clock-wise movement of sub-blocks of matrix B. Movements form a ring pattern among the accelerators 302, 304, 306, for instance, as shown by buffer movements 310, 312, 314. Since each accelerator 302, 304, 306 needs to see the entire matrix B, and n sub-blocks of matrix B are already within its own memory, (P−1)/P of matrix B is streamed into and out of an accelerator 302, 304, 306. As sub-blocks of matrix A are not in the accelerators memory, sub-blocks of A are streamed into the accelerators at the same time matrix B is rotated. In one embodiment, the sub-blocks of matrix A and sub-blocks of matrix B use different connections, and therefore, no interference exists. For example, a connection 316 is used between accelerator 0 302 and accelerator 1 304, a connection 318 is used between accelerator 1 304 and accelerator 2 306, and a connection 318 is used between accelerator 2 306 and accelerator 0 302; a connection 322 is used between accelerator 0 302 and the host 308, a connection 324 is used between accelerator 1 304 and the host 308, and a connection 326 is used between accelerator 2 306 and the host 308.

FIG. 3C illustrates a communication timeline of three accelerators as an example. Accelerators 302, 304, 306 execute in lock step. In one embodiment, as no sub-block of matrix A is given, the first or initial step demands the host 308 to push one sub-block of matrix A into each accelerator memory. In some embodiments, the sequence of computation steps is pre-programmed and depends on the dimensions of the given matrices. For each further step, one further sub-block of matrix A is pushed from the host 308 into each accelerator 302, 304, 306. This processing continues until the entire partition of matrix A is streamed into each accelerator 302, 304, 306. During each step, one sub-block of matrix B is pushed to a direct neighbor, hence at each step a sub-block of matrix B is received. In some embodiments, the direct neighbor is pre-configured by the host. At the same time, one multiplication is performed. After all of the sub-blocks of matrix B have been seen by each accelerator 302, 304, 306, communication for sub-blocks of matrix B can stop. Multiplications continue until all elements of matrix A are consumed.

Figure 4A:
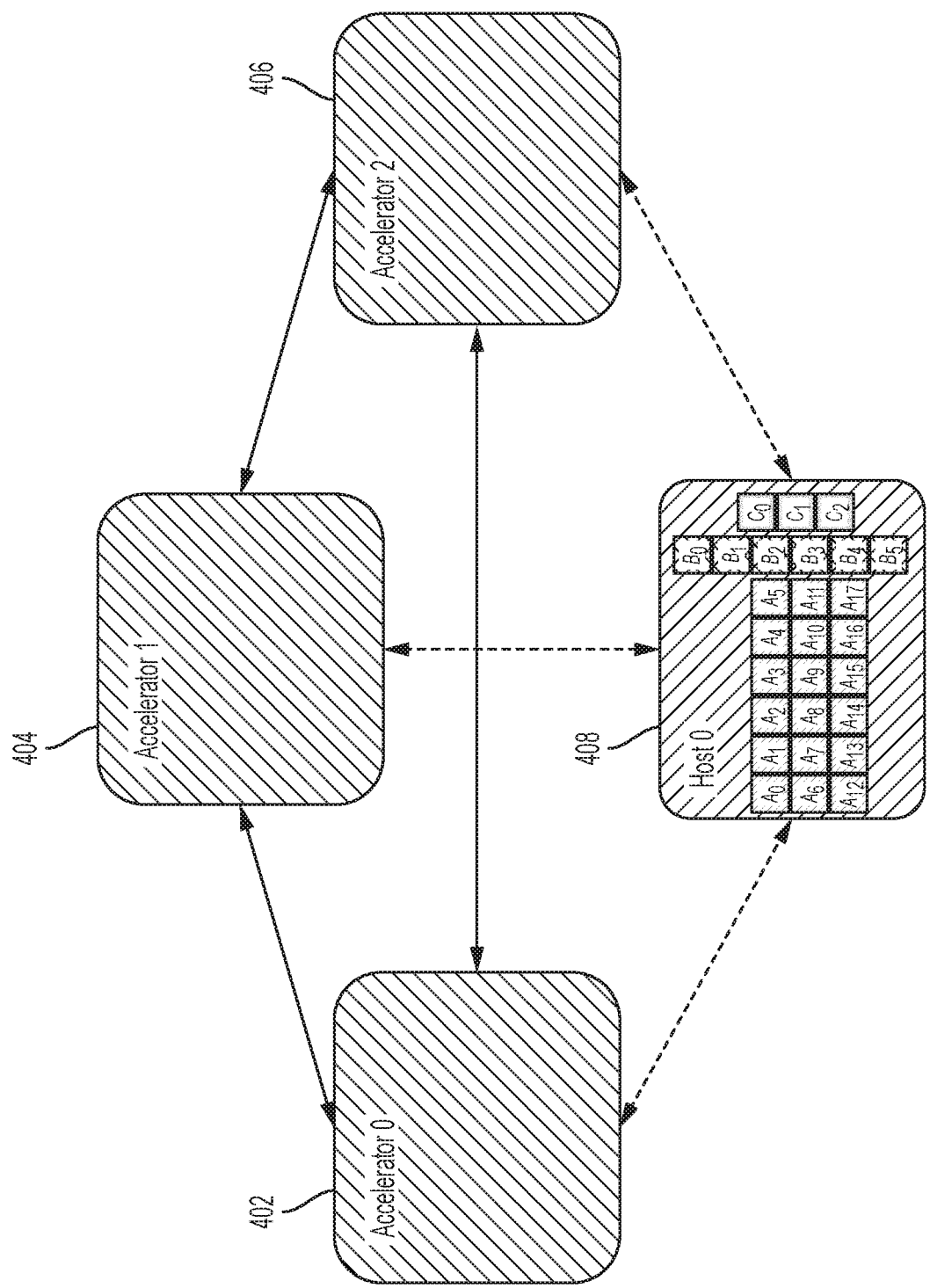
FIGS. 4A-4C illustrate an embodiment of a system configuration in performing GEMM in one embodiment.
Figure 4B:
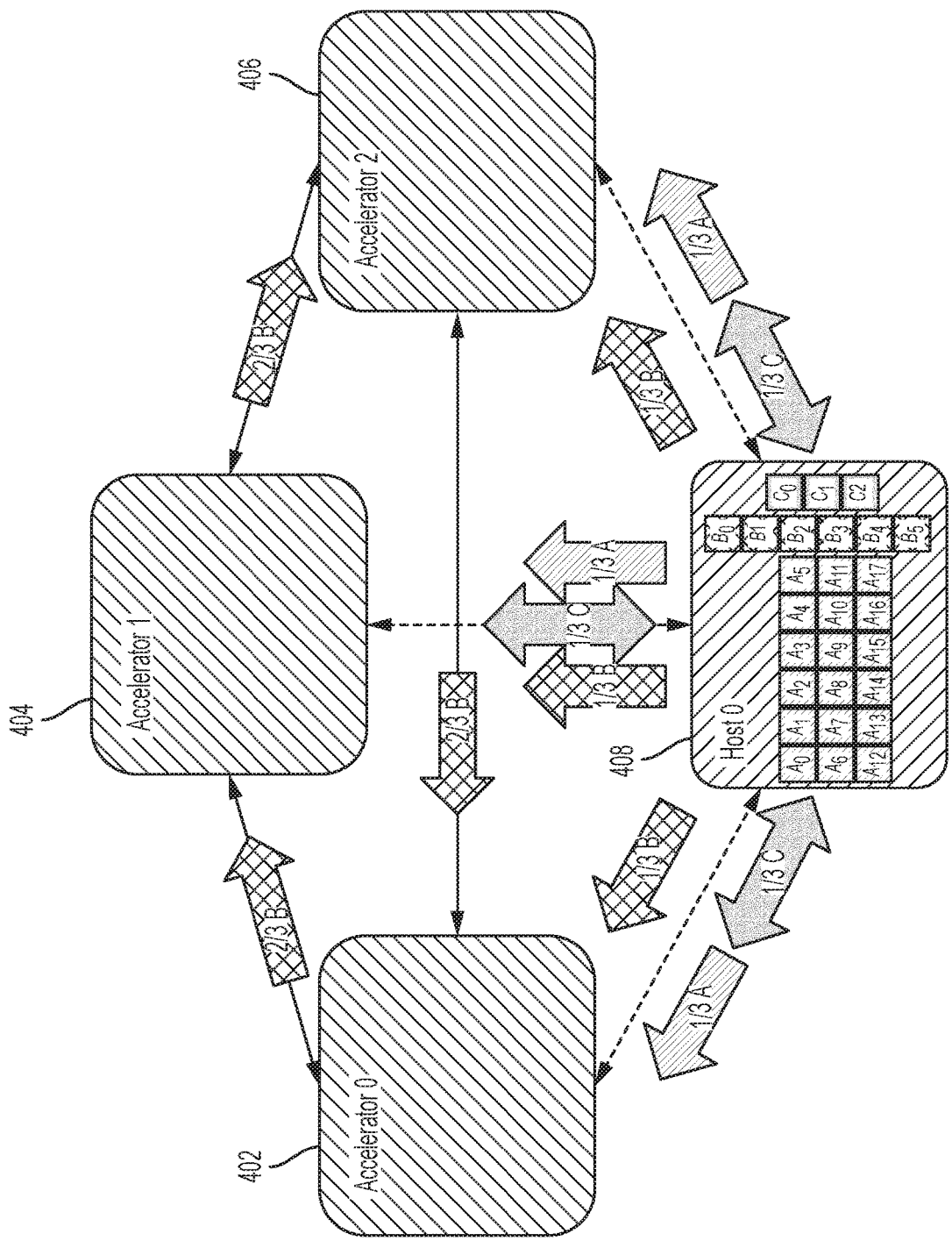
Figure 4C:
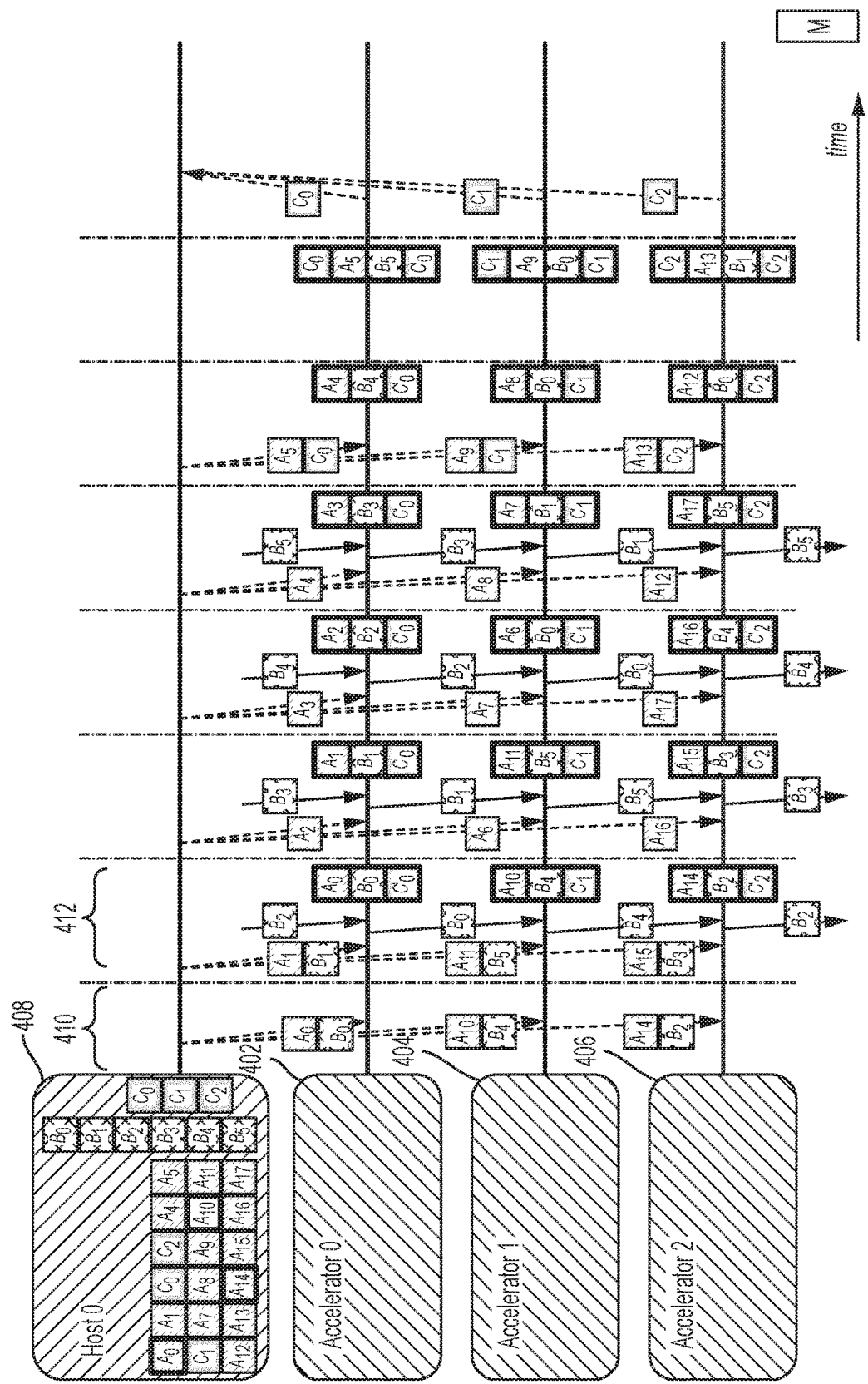

FIGS. 4A-4C illustrate an embodiment of a system configuration in performing GEMM in one embodiment. In this embodiment, P accelerators and a host computer in a heterogeneous system participate in GEMM operation, and matrices A, B, and C are stored or reside in host memory. FIG. 4A shows an initial state of the system configuration, in which the system includes three accelerators 402, 404, 406 and a host computer 408 participating in a GEMM operation in one embodiment. Matrices A and C are split by row into P partitions, stored in column-major order. All partitions of matrices A and C are stored in host memory of the host 408. Matrix B is split by row into P partitions, stored in column-major order on the host 408 as well. In one embodiment, the host 408 and accelerators 402, 404, 406 are connected by a uniform mesh. Entire matrix A and entire matrix B reside on the host 408.

FIG. 4B shows a buffer flow in a heterogeneous system with three accelerators in one embodiment. Each accelerator 402, 404, 406, in parallel, fetches a block of matrix C, so that all accelerators 402, 404, 406 work on a separate partition of matrix C. Each accelerator 402, 404, 406, in parallel, fetches one block of matrix A and one block of matrix B, such that they can be multiplied to produce a contribution to the local partition of matrix C.

Each accelerator 402, 404, 406, in parallel, multiplies one block of matrix B by the corresponding columns of the partition of matrix A fetched from the host 408. The result is accumulated into the local partition of matrix C. This processing continues until each accelerator out of P given accelerators loaded 1/P of matrices A, B and C.

As just 1/P of matrix B was read from the host, each accelerator 402, 404, 406, in parallel, reads the block of matrix B stored on its neighbor in a ring communication pattern. At the same time, each accelerator 402, 404, 406 fetches the next block of matrix A. In one embodiment, the same direction is used consistently in the transfers of B, for example, a clock-wise or a counter-clockwise ring. If the multiplication is complete, the processing terminates, with the result in matrix C, otherwise the processing restarts with fetching of block of matrix A and a block of matrix B. As none of the matrices reside in the accelerator memories, matrix A, matrix B and matrix C are streamed from the host 408 to the accelerators 402, 404, 406 until 1/P of matrices A, B and C are streamed. As matrix B can leverage the ring pattern among the accelerators 402, 404, 406, just one partition of matrix B is streamed into each accelerator, while the other P−1)/P of B are streamed into and out of the other accelerators. As sub-blocks of matrix A are not in the accelerators memory, sub-blocks of matrix A are streamed into the accelerators 402, 404, 406 at the same time matrix B is rotated and moved from the host memory of the host 408. After a partition of matrix B is streamed into each accelerator 402, 404, 406, only matrix A needs to be further streamed from host memory to the accelerators memory.

FIG. 4C illustrates a communication timeline of three accelerators as an example. Accelerators 402, 404, 406 execute in lock step. As no sub-block of matrix A and matrix B is given, initially, the host 408 pushes one sub-block of matrix A and one sub-block of matrix B into each accelerator memory, for example, as shown at time step 410. For each further step one further sub-block of matrix A and one further sub-block of matrix B is pushed from the host 408 into each accelerator, as shown at time step 412. During each step (after the initial step), a cached sub-block of matrix B already in an accelerator is pushed to the direct neighbor. At the same time one multiplication is performed. In this example, sub-blocks of matrix B are being streamed into the accelerators' memory until 1/P per accelerator have been read from host memory. FIG. 4C at 412 depicts how the re-use of blocks of matrix B is being performed. The subsequent steps following 412 do not require any blocks of matrix B from the host anymore as all of the blocks of matrix B are stored distributed across the accelerators' memory. Hence, subsequent steps can leverage the rotation of matrix B previously introduced to acquire all blocks of matrix B. After all of the sub-blocks of matrix B have been seen by each accelerator, communication for sub-blocks of matrix B can stop. Multiplications continue until all elements of matrix A are consumed.

Figure 5:
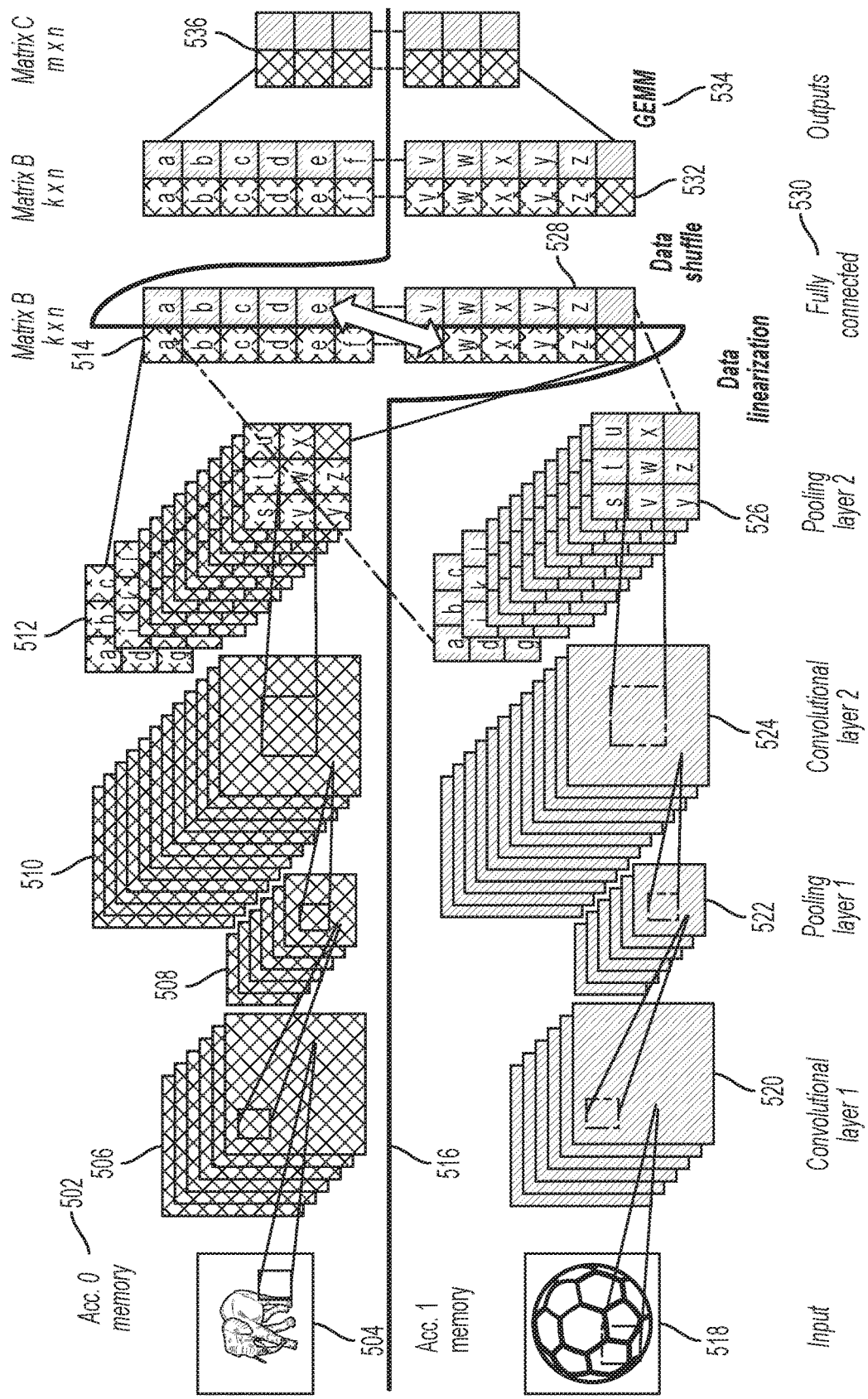
FIG. 5 is a diagram illustrating a machine learning model running on a heterogeneous hardware environment in one embodiment.

FIG. 5 is a diagram illustrating a machine learning model running on a heterogeneous hardware environment in one embodiment. As an example, particularly, the figure shows two accelerators running a convolutional neural network (CNN) flow. The CNNs, for example, perform classification of a given input image. Both accelerators execute separately all stages, up to the fully connected layer of a convolutional neural network. For example, accelerator 0 502 receives image data 504 and performs convolution and pooling (and/or other layer computations), and for instance, as shown, accelerator 0's memory holds feature maps 506, 508, 510, 512 resulting from convolution and pooling and a fully connected layer matrix 514 (e.g., referred to as matrix B) Likewise, in one embodiment accelerator 1 516 receives image data 518 and performs convolution and pooling (and/or other layer computations), and for instance, as shown, accelerator 1's memory holds feature maps 520, 522, 524, 526 resulting from convolution and pooling and matrix B 528 as a result of a fully connected layer.

At the fully connected layer 530, matrix B is distributed by row-block among the accelerators. As the layout of matrix B does not suit the column-based embodiment, (P−1)/P of matrix B is exchanged with a neighbor accelerators. For instance, in this example, where P=2, ½ of matrix B is exchanged with a neighbor accelerator (accelerator 0 or accelerator 1), for example, as shown at 532. Subsequently, according to an embodiment of a method in the present disclosure, the GEMM operation 534 is performed to achieve a column-distributed C (output). Thus, for example, each accelerator uses one or more other accelerators and corresponding memory space in performing computations of its neural network.

Figure 6:
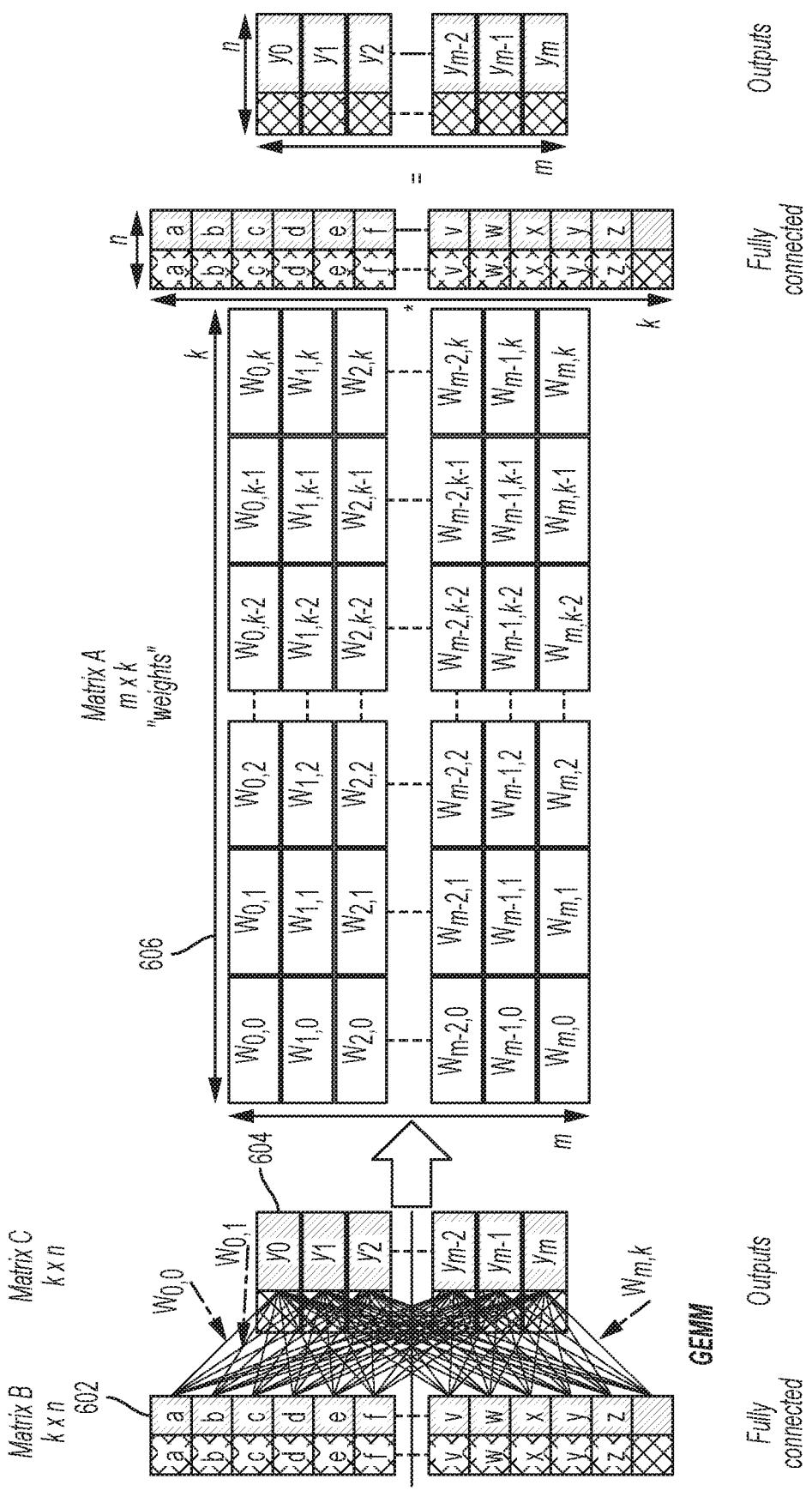
FIG. 6 illustrates a neural network layer, for example, the fully connected layer of a convolutional neural network and GEMM performed on the neural network layer in one embodiment.

FIG. 6 illustrates a neural network layer, for example, the fully connected layer of a convolutional neural network and GEMM performed on the neural network layer in one embodiment. FIG. 6, for example, highlights in detail a data shuffle 532 and GEMM 534 steps shown in FIG. 5, for instance, last step of the convolutional neural network. Taking a GEMM into consideration, the blocks 602 generated up to the fully connected layer represent the B matrix, while the output represents matrix C 604 (also shown at 536 in FIG. 5). The weights involved to perform a reduction of matrix B to matrix C, can be held by a weight matrix 606 that takes the role of matrix A in the embodiment. Any one of the GEMM operation techniques described above (e.g., with reference with FIGS. 2A-C, FIGS. 3A-C, or FIGS. 4A-C), for example, may be employed to perform this stage this of the CNN.

In some embodiments, the GEMM operation may include a pipelined operation. For instance, the P partitions of matrix B may be split each into n sub-blocks, and the method may operate on two sub-blocks at a time in a pipelined fashion. After an initial set up stage of multiplying the first sub-block of matrix B by the corresponding columns of matrix A, the stages of multiplying a sub-block of matrix B by the corresponding columns of matrix A and also reading a next sub-block stored in its neighboring accelerator may operate in parallel (e.g., executed concurrently), respectively on the i-th and the (i+1)-th sub-block of B. Such parallel processing overlaps communication and computation.

In some embodiments, by using additional buffers the copies (reading blocks from another computing element (e.g., host and/or accelerator)) can begin immediately, avoiding the initial setup stage. In these example embodiments, once the copies are completed the last block multiplications do not overlap.

In some embodiments, double ring pattern may be employed. With multiple sub-blocks per partition, it is possible to use two rings operating in parallel in opposite directions for two subsets of sub-blocks. Such bi-directional connections between the accelerators may utilize the full bandwidth available in both directions, for example, providing for efficient use of available bandwidth in a network of computer. This optimization also improves the performance of GEMM, for instance, in cases in which matrices A, B and C reside in accelerator memory.

In some embodiment matrix C can be copied from a hardware accelerator to a host memory device, for instance, depending on computation that follows. If, for example, matrix C is required for a new operation on the accelerators, it may be kept in the partitioned format on the accelerator memories. If, for example, the output of matrix C is required for further computations on the host, matrix C can be copied to the host memory and reassembled into a single matrix.

In some embodiments, e.g., responsive to determining that appropriate scatter, gather and/or strided access direct memory access (DMA) functionalities are available on the accelerator links and/or accelerator interconnect, the matrices need not be stored in blocks, but blocks can be created dynamically by copying from a contiguous source layout to a blocked representation in accelerator memory.

Figure 7:
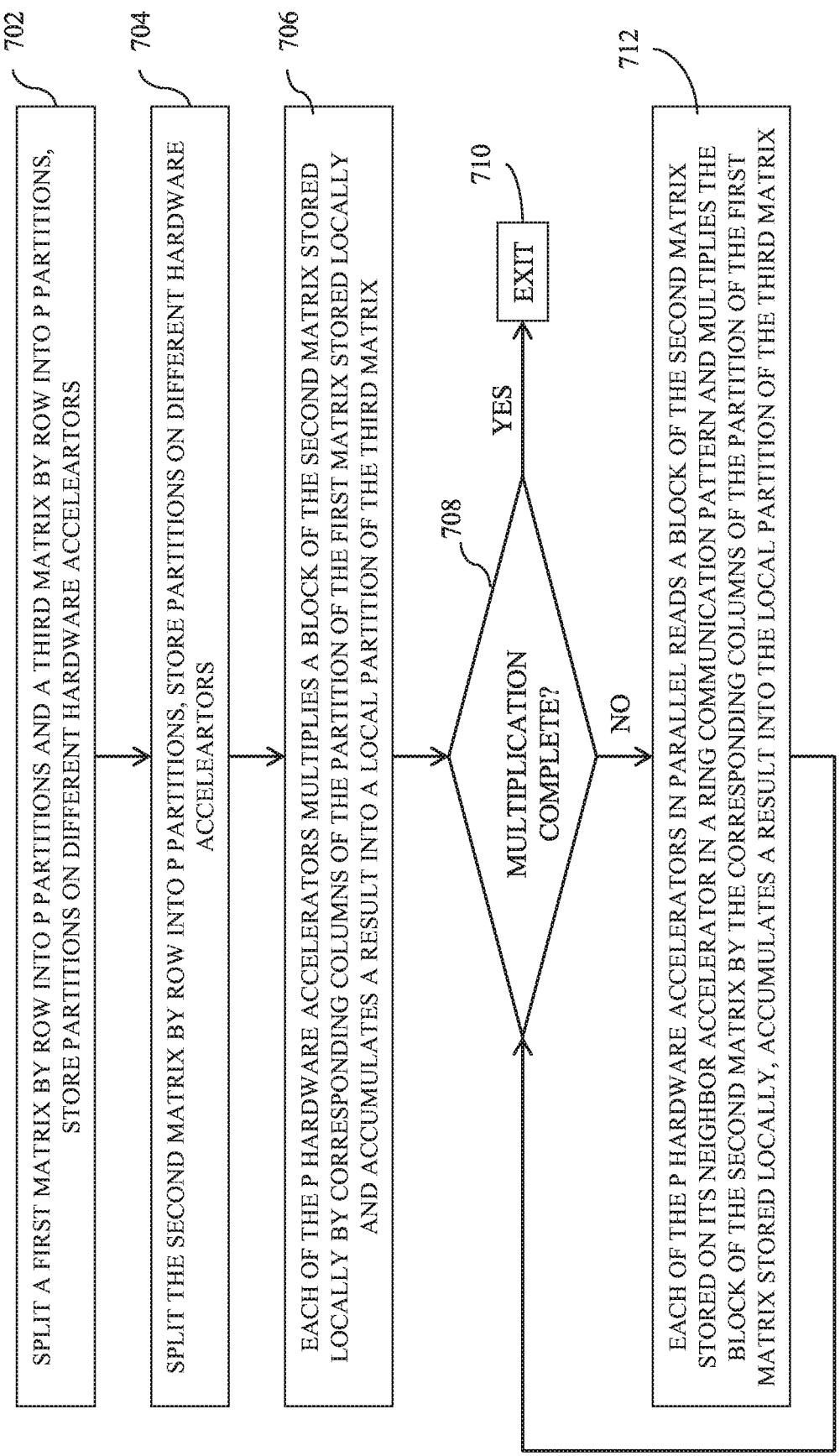
FIG. 7 is a diagram illustrating a computer-implemented method in one embodiment of performing a matrix to matrix operation involving a first matrix, a second matrix and a third matrix.

FIG. 7 is a diagram illustrating a computer-implemented method in one embodiment of performing a matrix to matrix operation involving a first matrix, a second matrix and a third matrix. The method, in one embodiment, is performed on a system or apparatus which includes hardware accelerators interconnected, for example, via an accelerator interconnect. Each of the plurality of hardware accelerators in one embodiment includes a special processing unit and accelerator memory. The system or apparatus, in one embodiment, also include at least one host computer coupled to each of the plurality of hardware accelerators, for example, via an accelerator link. The host computer, in one embodiment, includes a general processing unit and host memory.

At 702, the method includes splitting the first matrix by row into P partitions and the third matrix by row into P partitions. P represents the number of hardware accelerators involved in the matrix to matrix operation. Each partition of the first matrix and each partition of the third matrix stored on a different hardware accelerator.

At 704, the method also includes splitting the second matrix by row into P partitions. Each partition of the second matrix is stored by column on the different hardware accelerator.

At 706, each of the P hardware accelerators in parallel multiplies one block of the second matrix stored locally by corresponding columns of the partition of the first matrix stored locally and accumulates a result into a local partition of the third matrix.

At 708, if multiplication is complete, the method exits. For example, if all blocks of the second matrix have taken part in the matrix multiplication, the method exists at 710 and the result is left in the third matrix.

Otherwise, at 712, each of the P hardware accelerators in parallel reads a block of the second matrix stored on its neighbor accelerator in a ring communication pattern and multiplies the block of the second matrix, which is read, by the corresponding columns of the partition of the first matrix stored locally and accumulates a result into the local partition of the third matrix. Multiplying and reading repeats until all partitions of the second matrix have taken part in multiplication.

Figure 8:
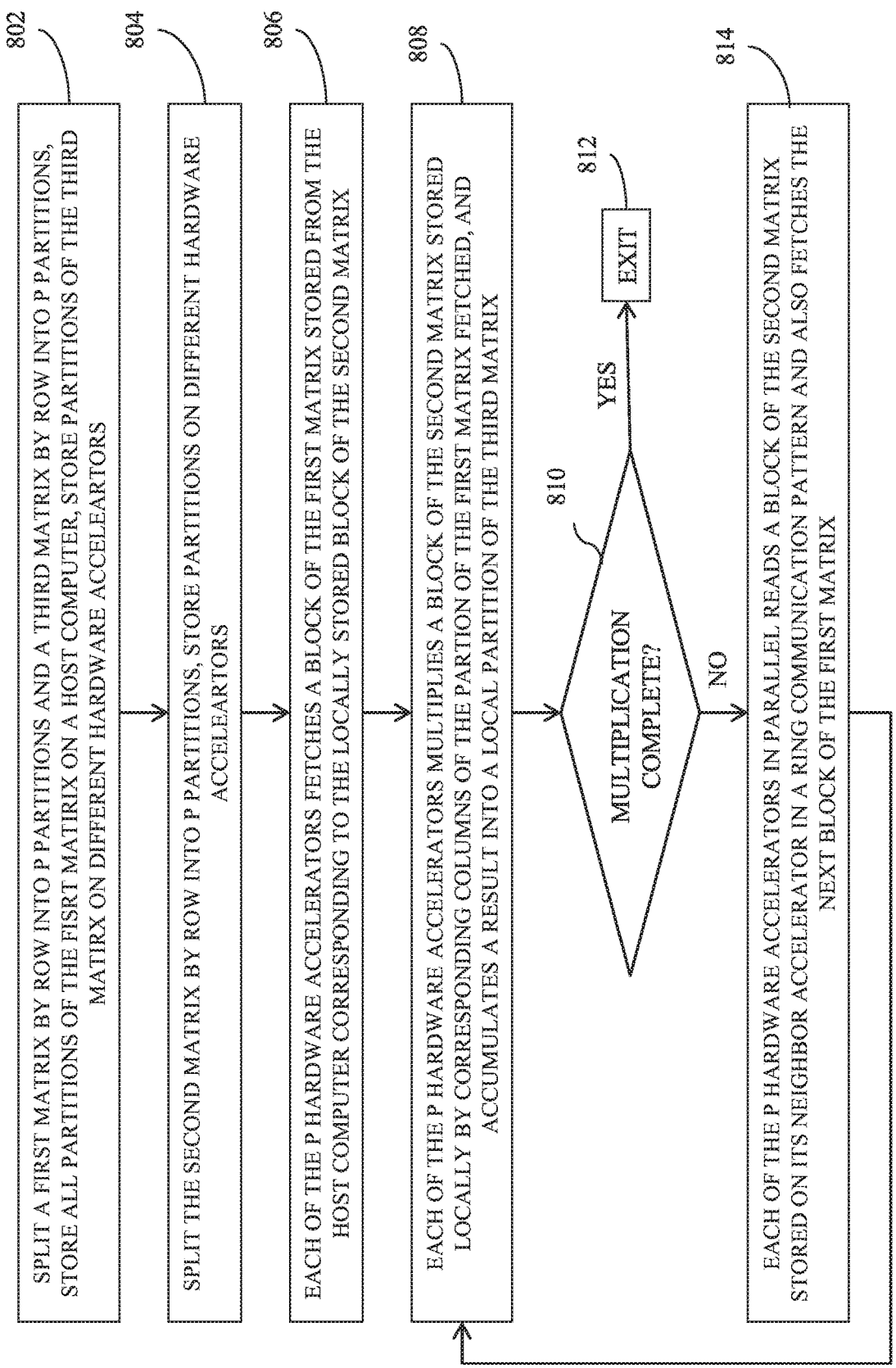
FIG. 8 is a diagram illustrating a computer-implemented method in another embodiment of performing a matrix to matrix operation involving a first matrix, a second matrix and a third matrix.

FIG. 8 is a diagram illustrating a computer-implemented method in another embodiment of performing a matrix to matrix operation involving a first matrix, a second matrix and a third matrix. The method, in one embodiment, is performed on a system or apparatus which includes hardware accelerators interconnected, for example, via an accelerator interconnect. Each of the plurality of hardware accelerators in one embodiment includes a special processing unit and accelerator memory. The system or apparatus, in one embodiment, also include at least one host computer coupled to each of the plurality of hardware accelerators, for example, via an accelerator link. The host computer, in one embodiment, includes a general processing unit and host memory.

At 802, the method includes splitting the first matrix by row into P partitions and the third matrix by row into P partitions, P representing a number of hardware accelerators involved in the matrix to matrix operation, all partitions of the first matrix stored on a host computer and each partition of the third matrix stored on a different hardware accelerator.

At 804, the second matrix is split by row into P partitions, each partition of the second matrix stored by column on the different hardware accelerator.

At 806, each of the P hardware accelerators in parallel fetches a block of the first matrix from the host computer corresponding to a locally stored block of the second matrix.

At 808, each of the P accelerators in parallel multiplies one block of the second matrix stored locally by corresponding columns of the partition of the first matrix fetched from the host computer and accumulates a result into a local partition of the third matrix.

At 810, if multiplication is complete, the method exits. For example, if all blocks of the second matrix have been used, the method exists at 812 and the result is left in the third matrix.

Otherwise, at 814, each of the P accelerators in parallel reads a block of the second matrix stored on its neighbor accelerator in a ring communication pattern and at the same time fetches the next block of the first matrix from the host computer. In one embodiment, a clock-wise direction may be employed in the ring communication pattern. In another embodiment, a counter-clock-wise direction may be employed in the ring communication pattern. In one embodiment, the same consistent pattern is employed throughout the iterations (e.g., repetitions of 808 to 814). The method repeats from the processing at 808, for example, multiplying, reading and fetching until all partitions of the second matrix have taken part in the multiplying.

Figure 9:
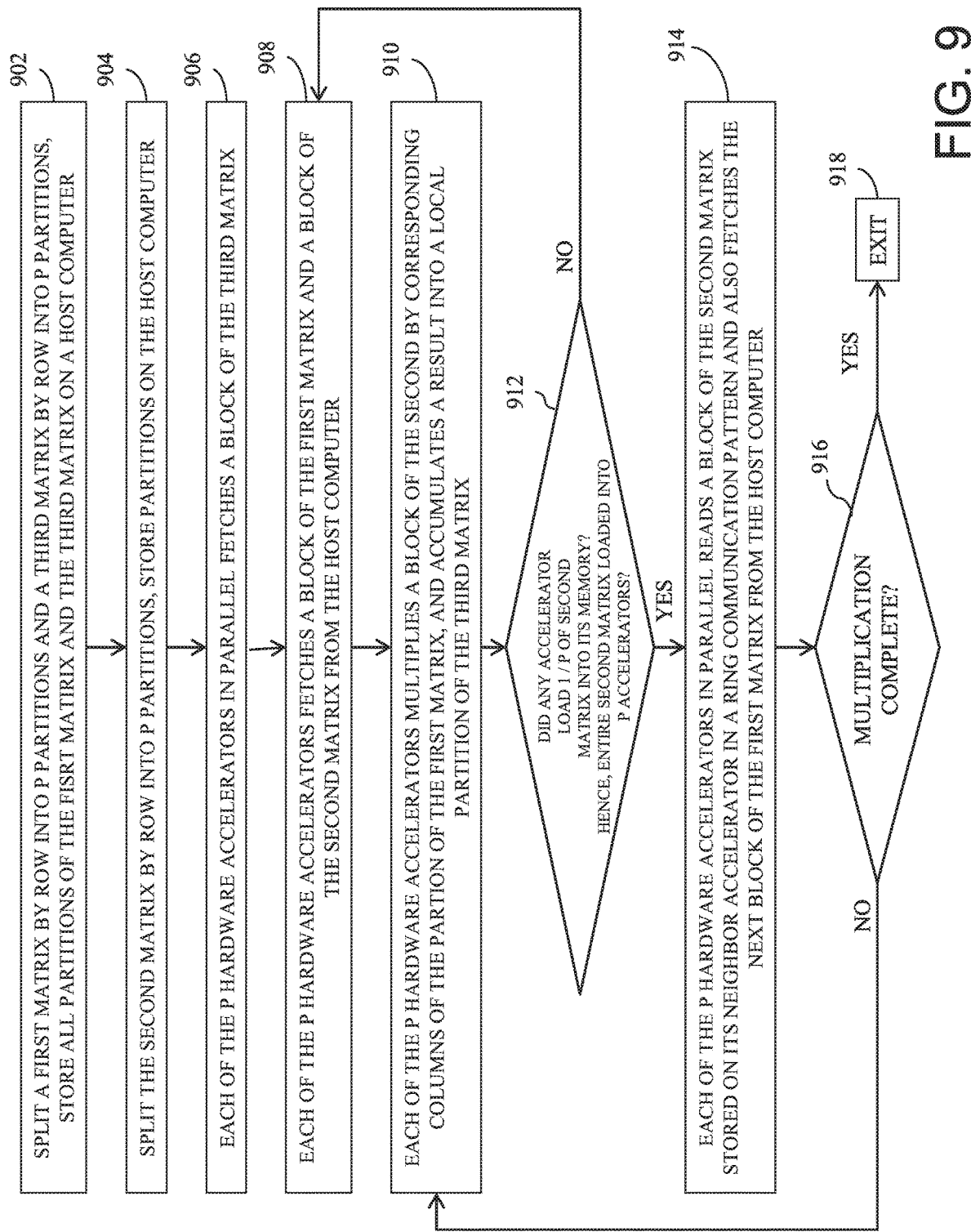
FIG. 9 is a diagram illustrating a computer-implemented method in another embodiment of performing a matrix to matrix operation involving a first matrix, a second matrix and a third matrix.

FIG. 9 is a diagram illustrating a computer-implemented method in another embodiment of performing a matrix to matrix operation involving a first matrix, a second matrix and a third matrix. The method, in one embodiment, is performed on a system or apparatus which includes hardware accelerators interconnected, for example, via an accelerator interconnect. Each of the plurality of hardware accelerators in one embodiment includes a special processing unit and accelerator memory. The system or apparatus, in one embodiment, also include at least one host computer coupled to each of the plurality of hardware accelerators, for example, via an accelerator link. The host computer, in one embodiment, includes a general processing unit and host memory.

At 902, the method includes splitting the first matrix by row into P partitions and the third matrix by row into P partitions. P represents a number of hardware accelerators involved in the matrix to matrix operation. All partitions of the first matrix and the third matrix stored on a host computer, for example, local memory associated with the host computer.

At 904, the method includes splitting the second matrix by row into P partitions. All partitions of the second matrix are stored by column on the host computer.

At 906, each of the P hardware accelerators in parallel fetches a block of the third matrix, for example, so that all of the P hardware accelerators work on a separate partition of the third matrix.

At 908, each of the P hardware accelerators in parallel fetches a block of the first matrix and a block of the second matrix from the host computer. The fetched block of the first matrix and fetched the block of the second matrix can be multiplied to produce a contribution to a local partition of the third matrix.

At 910, each of the P accelerators in parallel multiplies the block of the second matrix by corresponding columns of the partition of the first matrix fetched from the host computer and accumulates a result into the local partition of the third matrix.

At 912, if loading of the second matrix is complete, that is, considering there are P accelerators participating in the method, if each of the P accelerators loaded 1/P of blocks of the second matrix into its accelerator memory, the processing continues to 914, otherwise the processing continues to 908.

At 914, each of the P accelerators in parallel reads a block of the second matrix stored on its neighbor accelerator in a ring communication pattern and at the same time fetches the next block of the first matrix from the host computer.

At 916, if multiplication is complete, the method exits. For example, if all blocks of the second matrix have been used, the method exits at 918 and the result is stored in the third matrix. Otherwise, the processing continues to 908.

In one embodiment, a clock-wise direction may be employed in the ring communication pattern. In another embodiment, a counter-clock-wise direction may be employed in the ring communication pattern. In one embodiment, the same consistent pattern is employed throughout the iterations (e.g., repetitions of 908 to 916). The method repeats from the processing at 808, for example, multiplying, reading and fetching until all partitions of the second matrix have taken part in the multiplying.

FIG. 10 illustrates a schematic of an example computer or processing system that may implement a host computer system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a host computer module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A system comprising:
a plurality of hardware accelerators interconnected via an accelerator interconnect, each of the plurality of hardware accelerators comprising a special processing unit and accelerator memory; and
at least one host computer coupled to each of the plurality of hardware accelerators via an accelerator link, the at least one host computer comprising a general processing unit and host memory,
the plurality of hardware accelerators exchanging data in a ring communication pattern in computing a linear layer of a neural network, wherein each of the plurality of hardware accelerators, in parallel, reads a data block stored on a neighbor accelerator in the ring communication pattern employing a consistently same direction.

2. A system comprising:
a plurality of hardware accelerators interconnected via an accelerator interconnect, each of the plurality of hardware accelerators comprising a special processing unit and accelerator memory; and
at least one host computer coupled to each of the plurality of hardware accelerators via an accelerator link, the at least one host computer comprising a general processing unit and host memory,
the plurality of hardware accelerators exchanging data in a ring communication pattern in computing a linear layer of a neural network,
wherein input data comprising a matrix is partitioned into P parts, wherein P represents a number of the hardware accelerators,
wherein a hardware accelerator in the plurality of hardware accelerators stores one part of the P parts in the accelerator memory associated with the hardware accelerator, and
wherein the plurality of hardware accelerators exchanging data in a ring communication pattern comprises the hardware accelerator transferring a sub-block of the one part it stores to another hardware accelerator in the plurality of hardware accelerators.

3. The system of claim 2, wherein the hardware accelerator transfers the sub-block in parallel with performing a matrix computation.

4. The system of claim 2,
wherein the plurality of hardware accelerators exchanging data in a ring communication pattern comprises the hardware accelerator receiving a sub-block of a part stored in another one of the plurality of hardware accelerators from said another one of the plurality of hardware accelerators.

5. The system of claim 4, wherein only (P−1)/P partitions are streamed into and out of the hardware accelerator.

6. The system of claim 4, wherein only (P−1)/P partitions are streamed into and out of said another one of the plurality of hardware accelerators.

7. The system of claim 2, wherein the input data is initially stored on the host computer entirely, and the P parts are distributed to the hardware accelerators.

8. The system of claim 2, wherein the data exchanged comprises at least a part of a flattened matrix resulting at a fully connected layer of a convolutional neural network.

9. The system of claim 2, wherein the plurality of hardware accelerators comprises P number of hardware accelerators, and wherein the system performs a general matrix to matrix multiplication (GEMM) wherein at least three matrices comprising a first matrix, a second matrix and a third matrix are involved,
wherein the first matrix and the third matrix are split by row into P partitions and stored by column, each partition of the first matrix is stored on a different accelerator of the P accelerators and each partition of the third matrix is stored on the different accelerator of the P accelerators, and
wherein the second matrix is split by row into P partitions and each of the P partitions of the second matrix is stored by column on the different accelerator of the P accelerators.

10. The system of claim 9, wherein each of the P accelerators in parallel:
multiplies one block of the second matrix stored locally by corresponding columns of the partition of the first matrix stored locally and accumulates a result into a local partition of the third matrix; and
reads a block of the second matrix stored on its neighbor accelerator in the ring communication pattern and multiplies the block of the second matrix by the corresponding columns of the partition of the first matrix stored locally and accumulates a result into the local partition of the third matrix,
each of the P hardware accelerators repeating the reading of the block of the second matrix stored on its neighbor accelerator in the ring communication pattern and multiplying the block of the second matrix by the corresponding columns of the partition of the first matrix stored locally and accumulating the result into the local partition of the third matrix, until all partitions of the second matrix have taken part in the multiplying.

11. The system of claim 9, wherein the P partitions of the second matrix are further split into n sub-blocks, and the n sub-blocks are operated at a time in a pipelined fashion.

12. The system of claim 2, wherein the plurality of hardware accelerators comprises P number of hardware accelerators, and wherein the system performs a general matrix to matrix multiplication (GEMM) wherein at least three matrices comprising a first matrix, a second matrix and a third matrix are involved,
wherein the first matrix and the third matrix are split by row into P partitions and stored by column, all partitions of the first matrix are stored in the host memory, each partition of the third matrix is stored on a different accelerator of the P accelerators, and
wherein the second matrix is split by row into P partitions and each of the P partitions of the second matrix is stored by column on the different accelerator of the P accelerators.

13. The system of claim 12, wherein each of the P accelerators in parallel:
fetches a block of the first matrix from the host memory corresponding to a block of the second matrix stored in the respective accelerator;
multiplies one block of the second matrix stored locally by corresponding columns of the fetched block of the first matrix, and accumulates results in the corresponding partition of the third matrix stored locally; and
reads a block of the second matrix stored in a neighboring accelerator in the ring communication pattern and fetches a next block of the first matrix,
each of the P accelerators repeating the multiplying, reading and fetching until all partitions of the second matrix have taken part in the multiplying.

14. The system of claim 2, wherein the plurality of hardware accelerators comprises P number of hardware accelerators, and wherein the system performs a general matrix to matrix multiplication (GEMM) wherein at least three matrices comprising a first matrix, a second matrix and a third matrix are involved,
wherein the first matrix and the third matrix are split by row into P partitions and stored by column, all partitions of the first matrix and the third matrix are stored in the host memory, and
wherein the second matrix is split by row into P partitions and all of the P partitions of the second matrix is stored by column in the host memory.

15. The system of claim 14, wherein
each of the P hardware accelerators in parallel fetches a block of the third matrix wherein all of the P hardware accelerators work on a separate partition of the third matrix;
each of the P hardware accelerators in parallel fetches a block of the first matrix and a block of the second matrix from the host computer;
each of the P accelerators in parallel multiplies the block of the second matrix by corresponding columns of the partition of the first matrix fetched from the host computer and accumulates a result into the local partition of the third matrix;
each of the P accelerators in parallel reads a block of the second matrix stored on its neighbor accelerator in the ring communication pattern and at the same time fetches a next block of the first matrix from the host computer, and repeats the multiplying, reading and fetching until all partitions of the second matrix have taken part in the multiplying.

16. The system of claim 2, wherein at least one of the accelerator interconnect and the accelerator link comprises a direct memory access (DMA) functionality comprising at least one of scatter-gather and strided access, and blocks of the data are created dynamically by copying from a contiguous source layout to a blocked representation in the accelerator memory.

17. The system of claim 2, wherein the ring communication pattern comprises a clock-wise direction.

18. The system of claim 2, wherein the ring communication pattern comprises a counter-clock-wise direction.

19. A computer-implemented method of performing a matrix to matrix operation involving a first matrix, a second matrix and a third matrix, the method comprising:

splitting the first matrix by row into P partitions and the third matrix by row into P partitions, P representing a number of hardware accelerators involved in the matrix to matrix operation, each partition of the first matrix and each partition of the third matrix stored on a different hardware accelerator;

splitting the second matrix by row into P partitions, each partition of the second matrix stored by column on the different hardware accelerator;

each of the P hardware accelerators in parallel multiplying one block of the second matrix stored locally by corresponding columns of the partition of the first matrix stored locally and accumulating a result into a local partition of the third matrix;

each of the P hardware accelerators in parallel reading a block of the second matrix stored on its neighbor accelerator in a ring communication pattern and multiplying the block of the second matrix read by the corresponding columns of the partition of the first matrix stored locally and accumulating a result into the local partition of the third matrix;

each of the P hardware accelerators repeating the reading of the block of the second matrix stored on its neighbor accelerator in a ring communication pattern and multiplying the block of the second matrix read by the corresponding columns of the partition of the first matrix stored locally and accumulating a result into the local partition of the third matrix, until all partitions of the second matrix have taken part in the multiplying.

20. A computer-implemented method of performing a matrix to matrix operation involving a first matrix, a second matrix and a third matrix, the method comprising:

splitting the first matrix by row into P partitions and the third matrix by row into P partitions, P representing a number of hardware accelerators involved in the matrix to matrix operation, all partitions of the first matrix stored on a host computer and each partition of the third matrix stored on a different hardware accelerator;

splitting the second matrix by row into P partitions, each partition of the second matrix stored by column on the different hardware accelerator;

each of the P hardware accelerators in parallel fetching a block of the first matrix from the host computer corresponding to a locally stored block of the second matrix;

each of the P accelerators in parallel multiplying one block of the second matrix stored locally by corresponding columns of the partition of the first matrix fetched from the host computer and accumulating a result into a local partition of the third matrix;

each of the P accelerators in parallel reading a block of the second matrix stored on its neighbor accelerator in a ring communication pattern and at the same time fetching a next block of the first matrix from the host computer, and repeating the multiplying, reading and fetching until all partitions of the second matrix have taken part in the multiplying.

* * * * *